(12) United States Patent
Ichihashi et al.

(10) Patent No.: US 11,293,638 B2
(45) Date of Patent: Apr. 5, 2022

(54) COMBUSTOR HEAT SHIELD AND METHOD OF COOLING SAME

(71) Applicant: United Technologies Corporation, Farmington, CT (US)

(72) Inventors: Fumitaka Ichihashi, Unionville, CT (US); Timothy S. Snyder, Glastonbury, CT (US); Jeffrey J. Lienau, Wethersfield, CT (US); Baris A. Sen, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 199 days.

(21) Appl. No.: 16/549,722

(22) Filed: Aug. 23, 2019

(65) Prior Publication Data
US 2021/0055000 A1   Feb. 25, 2021

(51) Int. Cl.
*F23R 3/08* (2006.01)
*F01D 25/12* (2006.01)
*F01D 25/26* (2006.01)

(52) U.S. Cl.
CPC .............. *F23R 3/08* (2013.01); *F01D 25/12* (2013.01); *F01D 25/26* (2013.01); *F05D 2260/201* (2013.01); *F05D 2260/232* (2013.01)

(58) Field of Classification Search
CPC .. F23R 3/005; F23R 3/002; F23R 3/04; F23R 3/10; F23R 3/08; F05D 2260/201; F05D 2260/232; F01D 25/12; F01D 25/26
See application file for complete search history.

(56) References Cited

U.S. PATENT DOCUMENTS

| 5,253,471 | A | 10/1993 | Richardson |
| 5,396,759 | A | 3/1995 | Richardson |
| 5,490,389 | A | 2/1996 | Harrison et al. |
| 7,665,306 | B2 | 2/2010 | Bronson et al. |
| 8,938,970 | B2* | 1/2015 | Gerendas .................. F23R 3/10 60/752 |
| 9,625,152 | B2* | 4/2017 | Papple ....................... F23R 3/10 |
| 9,982,890 | B2 | 5/2018 | Papple et al. |
| 10,267,521 | B2* | 4/2019 | Papple ....................... F23R 3/04 |
| 2005/0086940 | A1* | 4/2005 | Coughlan, III ......... F23R 3/002 60/752 |

(Continued)

OTHER PUBLICATIONS

EP search report for EP20191789.5 dated Jan. 21, 2021.

*Primary Examiner* — Craig Kim
(74) *Attorney, Agent, or Firm* — Getz Balich LLC (57) ABSTRACT

A combustor for a gas turbine engine includes an annular shell, an annular bulkhead connected to the shell, and a heat shield panel. The heat shield panel has a first surface facing a combustion chamber and a second surface opposite the first surface. The heat shield panel is mounted to the bulkhead and defines a cooling chamber between the bulkhead and the heat shield panel. The heat shield panel has a wall extending from the heat shield panel toward the bulkhead around at least a portion of a periphery of the heat shield panel. The wall includes a circumferential wall portion including at least one cooling air passage extending between the cooling chamber and a cavity defined between the circumferential wall portion and the shell. The at least one cooling air passage is configured to purge the cavity by directing a first cooling air stream from the cooling chamber into the cavity.

18 Claims, 10 Drawing Sheets

(56) References Cited

U.S. PATENT DOCUMENTS

| | | | |
|---|---|---|---|
| 2008/0104962 A1* | 5/2008 | Patel | F23R 3/10 |
| | | | 60/752 |
| 2011/0185739 A1* | 8/2011 | Bronson | F02C 7/18 |
| | | | 60/755 |
| 2015/0135720 A1 | 5/2015 | Papple | |
| 2015/0260404 A1* | 9/2015 | Sullivan | F23R 3/10 |
| | | | 60/754 |
| 2015/0345789 A1 | 12/2015 | Papple | |
| 2015/0362191 A1* | 12/2015 | Papple | F23R 3/002 |
| | | | 60/772 |
| 2016/0040880 A1* | 2/2016 | Sreekanth | F23R 3/10 |
| | | | 60/782 |
| 2016/0273772 A1* | 9/2016 | Cunha | F23R 3/005 |
| 2016/0298841 A1 | 10/2016 | Papple | |
| 2017/0146241 A1* | 5/2017 | Graves | F23R 3/002 |
| 2017/0248311 A1* | 8/2017 | Ozem | F23R 3/002 |
| 2018/0238547 A1 | 8/2018 | Quach | |

* cited by examiner

COMBUSTOR HEAT SHIELD AND METHOD OF COOLING SAME

BACKGROUND

1. Technical Field

This disclosure relates generally to combustors for gas turbine engines, and more particularly to heat shields for use in a combustor.

2. Background Information

Combustors, such as those used in gas turbine engines, may generally include radially spaced inner and outer shells which define a combustion chamber therebetween. A bulkhead may be provided at the forward end of the combustion chamber to shield a forward section of the combustor from the relatively high temperatures in the combustion chamber. A heat shield including one or more heat shield panels may be mounted on the bulkhead for further heat protection. Typically, relatively cool air from outside of the combustor is used to cool the bulkhead side of the heat shield panels. This cooling air may then be directed into the combustion chamber through effusion holes in the heat shield extending between the bulkhead side and the combustion chamber side.

However, in an attempt to improve flame anchoring within the combustor, modern heat shield panels may not contain large amounts of effusion holes. Due to the nature of hot gas recirculation near the heat shield, the lack of effusion cooling holes in the heat shield panels may result in significantly increased heat shield temperatures in the mid cavity (e.g., 6 and 12 o'clock) portions of the heat shield. This high-temperature effect on the heat shield can be particularly aggravated in proximity to low-flow cavity regions disposed between the heat shield and the combustor shells.

SUMMARY

According to an embodiment of the present disclosure, a combustor for a gas turbine engine includes an annular shell, an annular bulkhead connected to the shell, and a heat shield panel. The heat shield panel has a first surface facing a combustion chamber and a second surface opposite the first surface. The heat shield panel is mounted to the bulkhead and defines a cooling chamber between the bulkhead and the heat shield panel. The heat shield panel has a wall extending from the heat shield panel toward the bulkhead around at least a portion of a periphery of the heat shield panel. The wall includes a circumferential wall portion including at least one cooling air passage extending between the cooling chamber and a cavity defined between the circumferential wall portion and the shell. The at least one cooling air passage is configured to purge the cavity by directing a first cooling air stream from the cooling chamber into the cavity.

In the alternative or additionally thereto, in the foregoing embodiment, the combustor further includes a liner panel mounted to the shell. The liner panel has a first end portion at a first end of the liner panel. The first end portion further defines the cavity.

In the alternative or additionally thereto, in the foregoing embodiment, the liner panel has a first surface facing away from the shell and a second surface opposite the first surface. The liner panel includes a liner wall extending from the second surface of the liner panel at the first end of the liner panel and contacting the shell.

In the alternative or additionally thereto, in the foregoing embodiment, the first end portion of the liner panel is configured to direct the first cooling air stream from the cavity to the first surface of the heat shield panel.

In the alternative or additionally thereto, in the foregoing embodiment, the liner panel includes at least one effusion hole directed toward the heat shield panel.

In the alternative or additionally thereto, in the foregoing embodiment, the at least one effusion hole is directed toward a radial end portion of the heat shield panel.

In the alternative or additionally thereto, in the foregoing embodiment, the heat shield panel includes an opening having an opening center axis. The opening extends through the heat shield panel between the first surface and the second surface of the heat shield panel.

In the alternative or additionally thereto, in the foregoing embodiment, the heat shield panel includes a plurality of cooling holes disposed about the opening and extending through the heat shield panel between the first surface and the second surface of the heat shield panel.

In the alternative or additionally thereto, in the foregoing embodiment, each cooling hole of the plurality of cooling holes is directed, at least in part, radially inward with respect to the opening central axis.

In the alternative or additionally thereto, in the foregoing embodiment, the heat shield panel is free of penetrations between the plurality of cooling holes and the at least one cooling air passage.

In the alternative or additionally thereto, in the foregoing embodiment, the at least one cooling air passage is a plurality of cooling air holes.

In the alternative or additionally thereto, in the foregoing embodiment, the plurality of cooling holes extend substantially perpendicularly through the circumferential wall portion.

In the alternative or additionally thereto, in the foregoing embodiment, the circumferential wall portion extends from the second surface of the heat shield panel a portion of a distance between the heat shield panel and the bulkhead.

In the alternative or additionally thereto, in the foregoing embodiment, the first cooling air stream is unobstructed between the circumferential wall portion and the shell.

According to another embodiment of the present disclosure, a combustor for a gas turbine engine includes an annular outer shell and an annular inner shell radially spaced from the outer shell. A bulkhead connects the outer shell to the inner shell. A heat shield panel has a first surface facing a combustion chamber and a second surface opposite the first surface. The heat shield panel is mounted to the bulkhead and defines a cooling chamber between the bulkhead and the heat shield panel. The heat shield panel has a wall extending from the heat shield panel toward the bulkhead around at least a portion of a periphery of the heat shield panel. The wall includes an outer circumferential wall portion and an inner circumferential wall portion. The outer circumferential wall portion includes a first at least one cooling air passage extending between the cooling chamber and an outer cavity defined between the outer circumferential wall portion and the outer shell and the inner circumferential wall portion includes a second at least one cooling air passage extending between the cooling chamber and an inner cavity defined between the inner circumferential wall portion and the inner shell. The first at least one cooling air passage is configured to purge the outer cavity by directing a first cooling air stream from the cooling chamber into the outer cavity and the second at least one cooling air passage is configured to purge the inner cavity by directing a second cooling air stream from the cooling chamber into the inner cavity.

In the alternative or additionally thereto, in the foregoing embodiment, the combustor further includes a plurality of liner panels. A first liner panel of the plurality of liner panels is mounted to the outer shell and a second liner panel of the plurality of liner panels is mounted to the inner shell. The first liner panel has a first forward end portion at a first forward end of the first liner panel. The first forward end portion further defining the outer cavity. The second liner panel has a second forward end portion at a second forward end of the second liner panel. The second forward end portion further defines the inner cavity. Each of the first liner panel and the second liner panel include at least one effusion hole directed toward the heat shield panel.

In the alternative or additionally thereto, in the foregoing embodiment, the heat shield panel includes an opening having an opening center axis, the opening extending through the heat shield panel between the first surface and the second surface of the heat shield panel, and a plurality of cooling holes disposed about the opening and extending through the heat shield panel between the first surface and the second surface of the heat shield panel. Each cooling hole of the plurality of cooling holes is directed, at least in part, radially inward with respect to the opening central axis. The heat shield panel is free of penetrations between the plurality of cooling holes and the at least one cooling air passage.

According to another embodiment of the present disclosure, a method for cooling a combustor for a gas turbine engine is provided. The method includes providing a heat shield panel mounted to a bulkhead and defining a cooling chamber between the bulkhead and the heat shield panel. The heat shield panel has a wall extending from the heat shield panel toward the bulkhead around at least a portion of a periphery of the heat shield panel. The wall includes a circumferential wall portion including at least one cooling air passage extending between the cooling chamber and a cavity defined between the circumferential wall portion and a shell connected to the bulkhead. The method further includes purging the cavity by directing a first cooling air stream, with the at least one cooling air passage, from the cooling chamber into the cavity.

In the alternative or additionally thereto, in the foregoing embodiment, the method further includes directing a second cooling air stream toward the heat shield with at least one effusion hole extending through a liner panel mounted to the shell.

In the alternative or additionally thereto, in the foregoing embodiment, the heat shield panel includes an opening having an opening center axis. The method further includes directing a third cooling air stream radially inward with respect to the opening center axis with a plurality of cooling holes extending through the heat shield.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1:
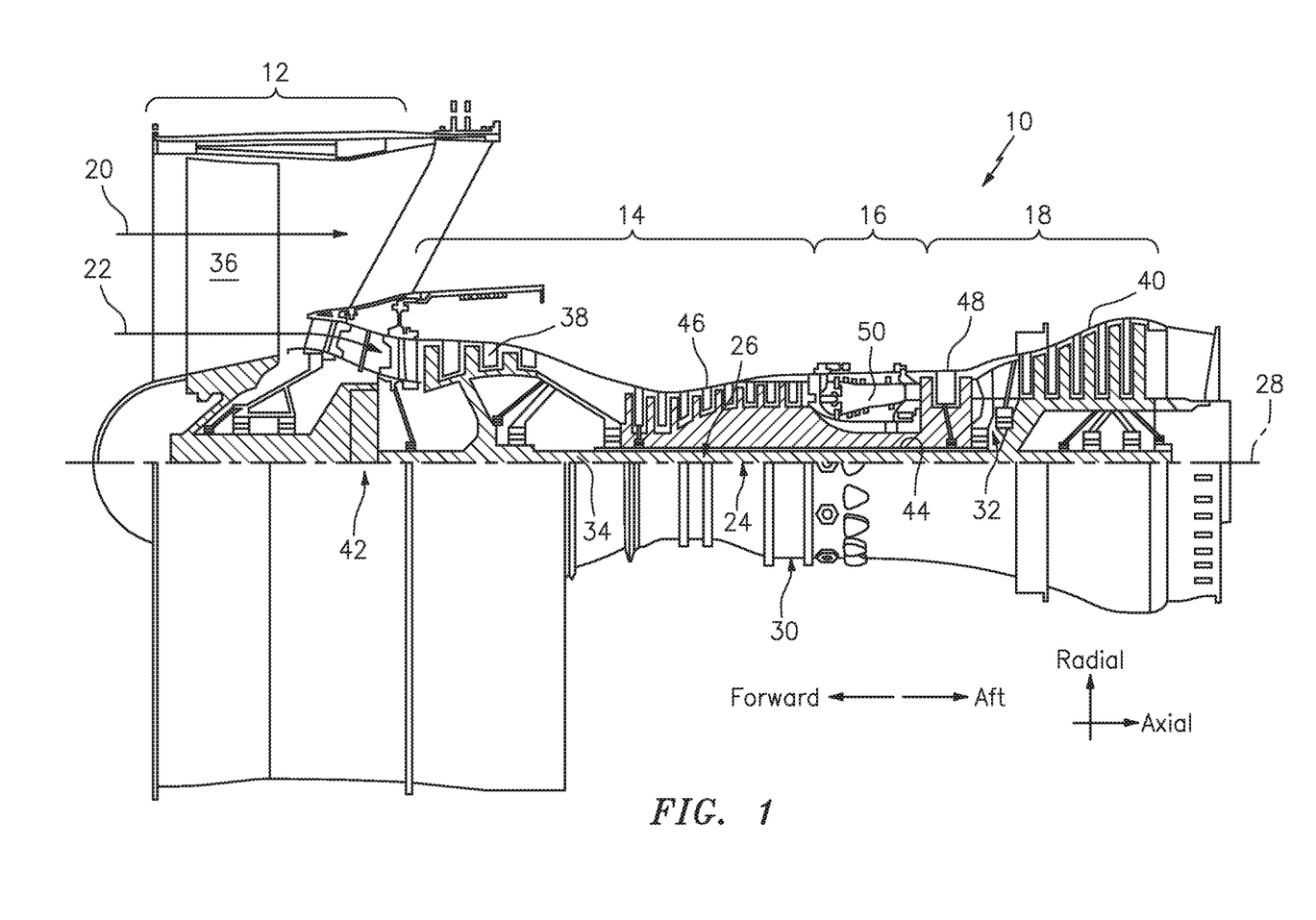
FIG. 1 illustrates a side cross-sectional view of a gas turbine engine in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low spool 24 and a high spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low spool 24. The high spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flowpath 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low spool 24 and the high spool 26, respectively, in response to the expansion.

Referring to FIGS. 2, 3, 4A-D, and 5A-C, the combustor 50 includes an annular outer shell 52 and an annular inner shell 54 spaced radially inward of the outer shell 52, thus defining an annular combustion chamber 56 therebetween. An annular hood 58 is positioned axially forward of the outer shell 52 and the inner shell 54 and spans between and sealably connects to respective forward ends of the outer shell 52 and the inner shell 54. It should be understood that relative positional terms, such as "forward," "aft," "upper," "lower," "above," "below," and the like are relative to the normal operational attitude of the gas turbine engine 10 and should not be considered otherwise limiting.

Figure 2:
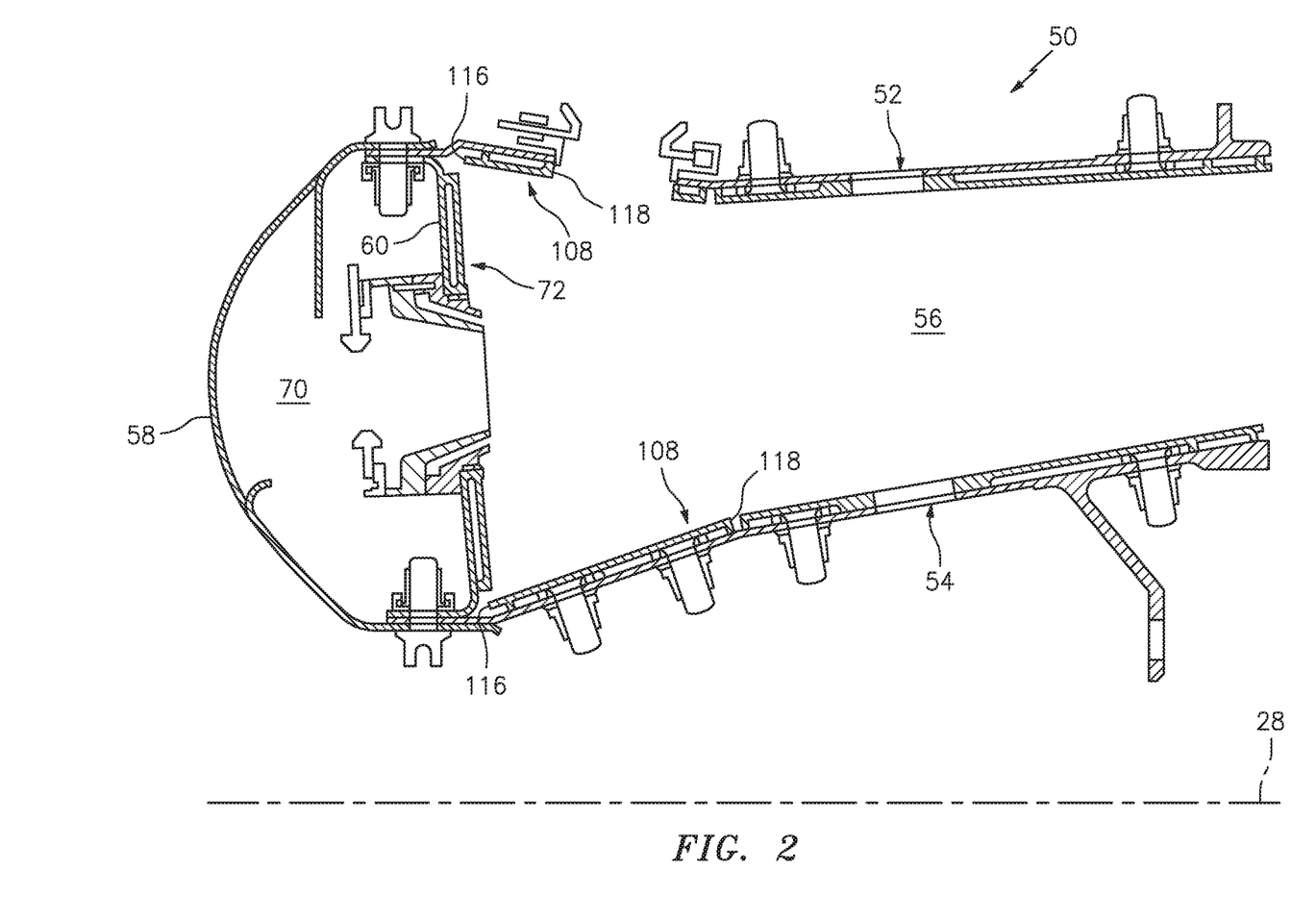
FIG. 2 illustrates a cross-sectional view of an exemplary combustor of a gas turbine engine in accordance with one or more embodiments of the present disclosure.

A bulkhead 60 includes a first side 62 facing the combustion chamber 56 and a second side 64 opposite the first side 62. The bulkhead 60 further includes an outer radial end 66 and an inner radial end 68 opposite the outer radial end 66. The bulkhead 60 may be connected to and extend between the outer shell 52 and the inner shell 54. For example, the bulkhead 60 may be connected to the outer shell 52 at the outer radial end 66 while the bulkhead 60 may be connected to the inner shell 54 at the inner radial end 68. The bulkhead 60 divides the combustion chamber 56 and a hood chamber 70. An annular heat shield 72 is mounted to the first side 62 of the bulkhead 60 and generally serves to thermally protect the bulkhead 60 and forward portions of the combustor 50, such as the hood chamber 70.

Figure 3:
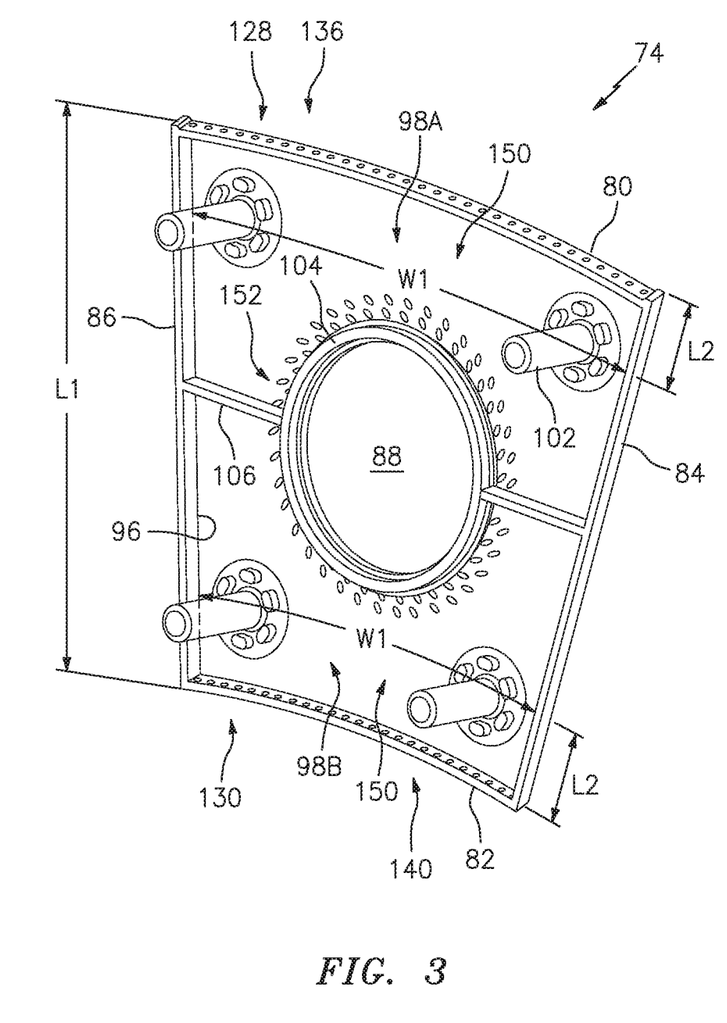
FIG. 3 illustrates a perspective view of a heat shield panel of the combustor of FIG. 2 in accordance with one or more embodiments of the present disclosure.
Figure 4A:
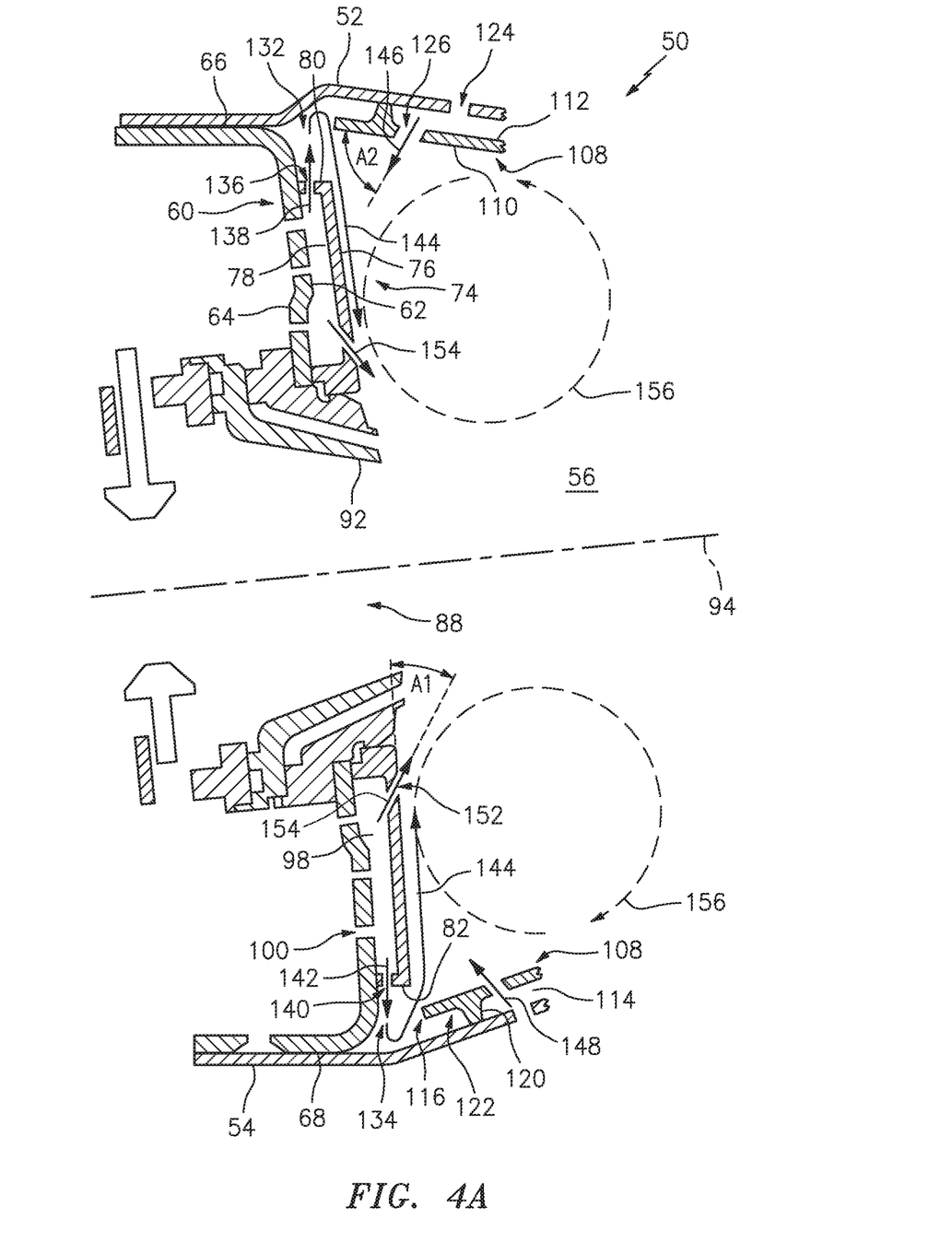
FIGS. 4A-D illustrate cross-sectional views of a portion of the combustor of FIG. 2 in accordance with one or more embodiments of the present disclosure.
Figure 4B:
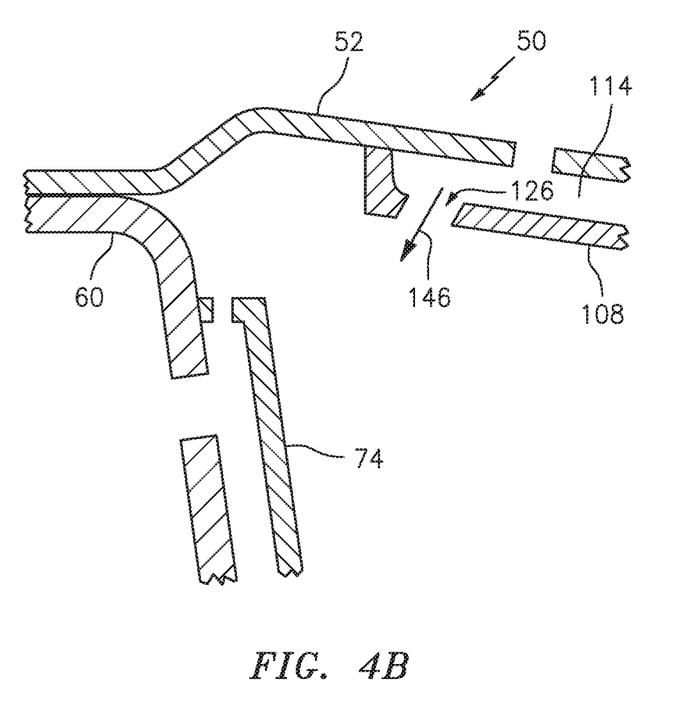
Figure 4C:
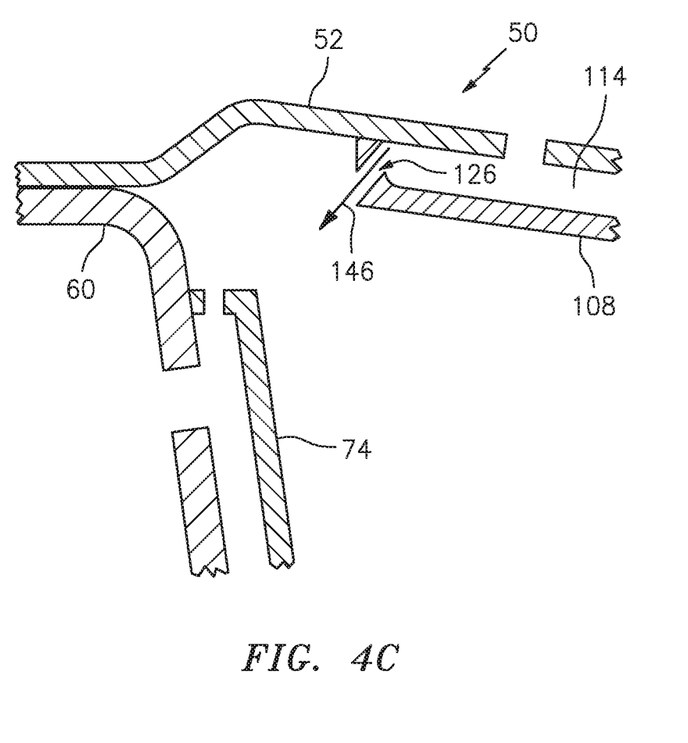
Figure 4D:
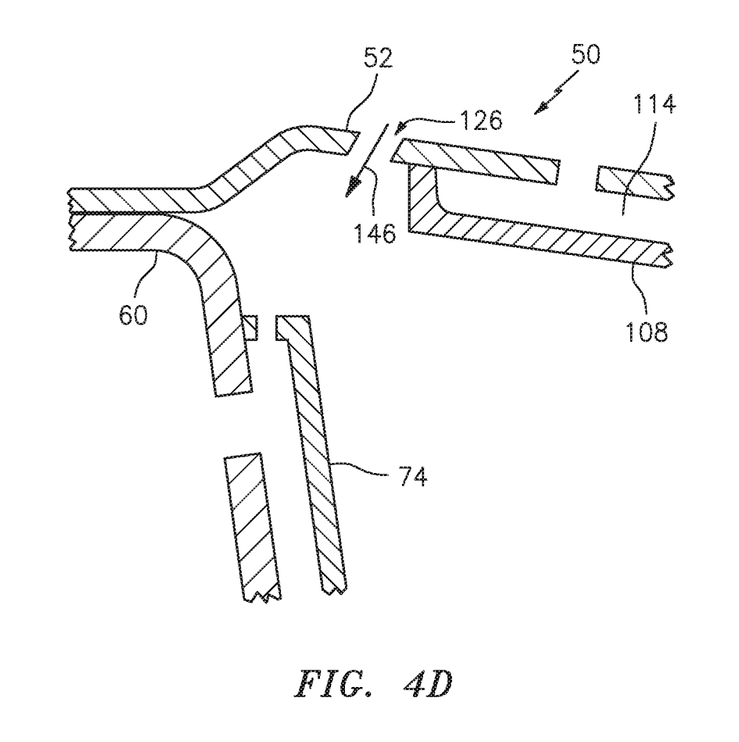
Figure 5A:
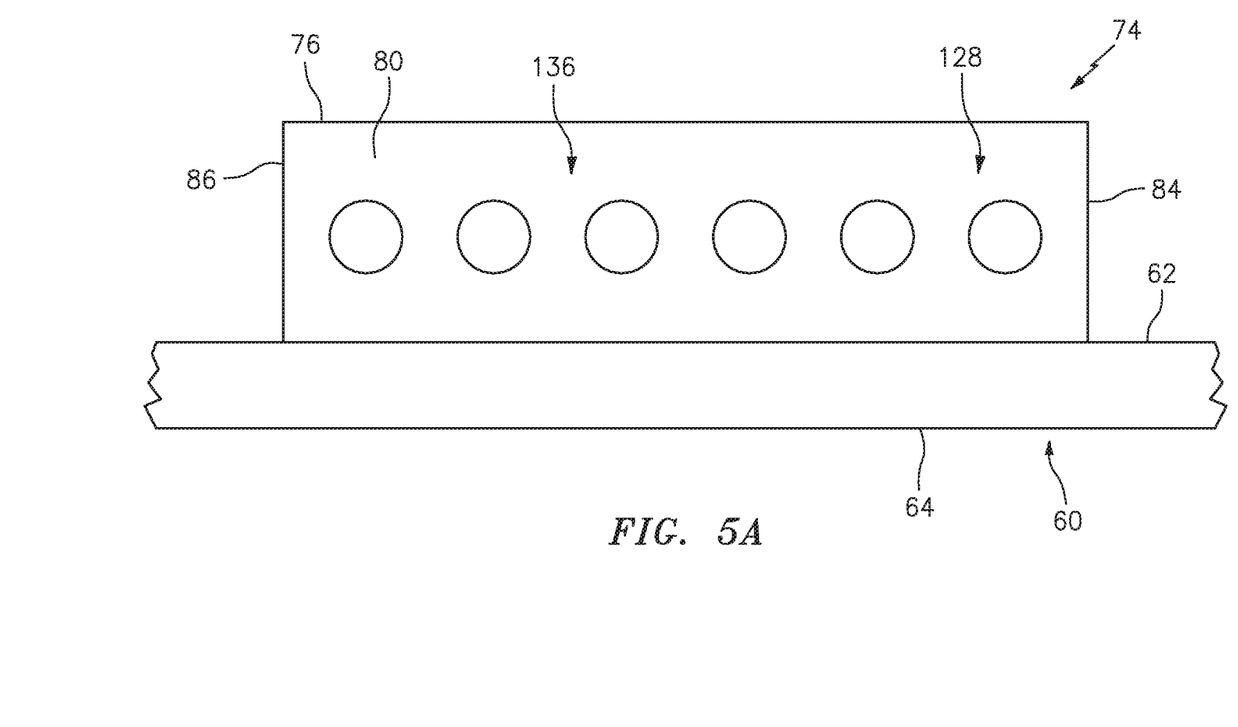
FIGS. 5A-C illustrate top views of the heat shield panel of FIG. 3 in accordance with one or more embodiments of the present disclosure.
Figure 5B:
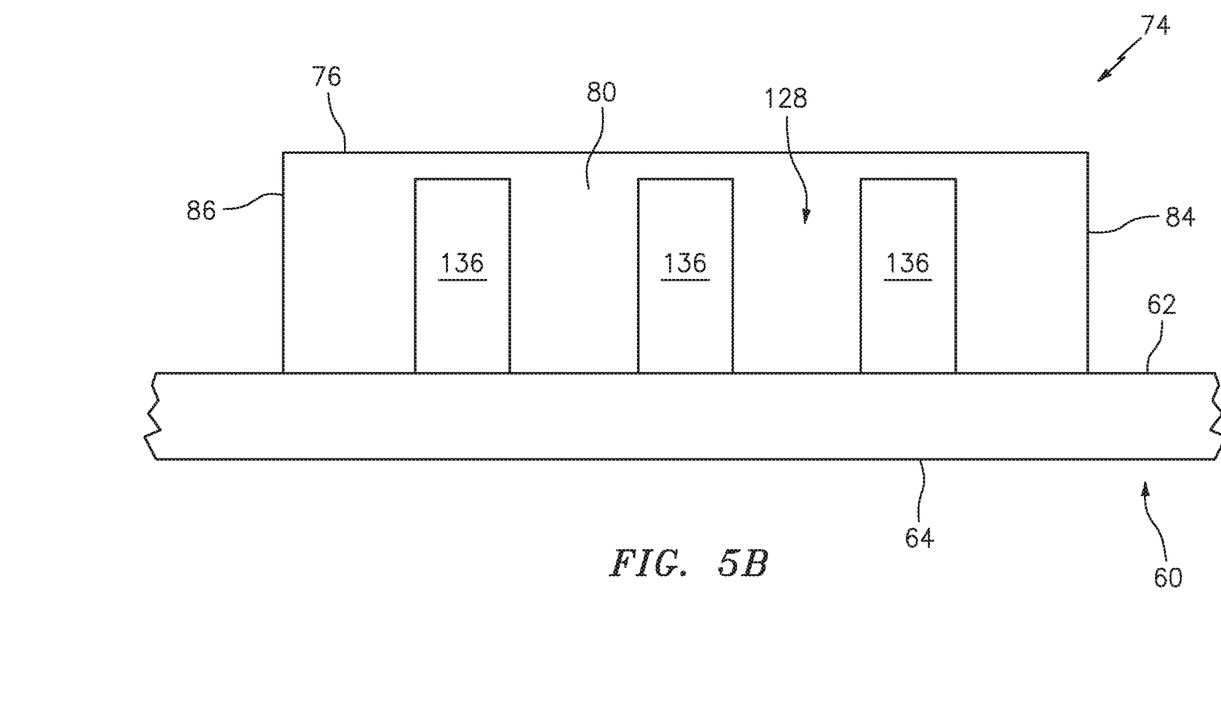
Figure 5C:
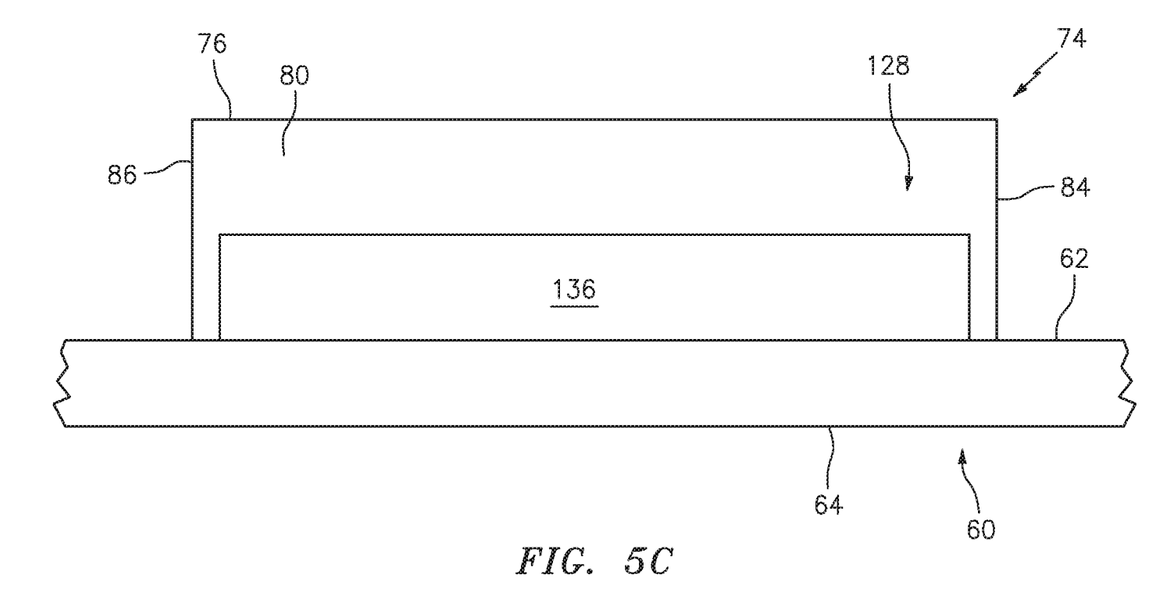

The heat shield 72 includes one or more heat shield panels 74. The heat shield panel 74 may include a first surface 76 facing the combustion chamber 56 and a second surface 78 opposite the first surface 76, an outer circumferential side 80 and an inner circumferential side 82 opposite the outer circumferential side 80, and a first radially extending side 84 and a second radially extending side 86 opposite the first radially extending side 84. Each of the first radially extending side 84 and the second radially extending side 86 may extend radially between the outer circumferential side 80 and the inner circumferential side 82. The heat shield panel 74 may include an opening 88 extending through the heat shield panel 74 between the first surface 76 and the second surface 78. The opening 88 may be configured to receive a mixture of fuel and air for combustion in the combustion chamber 56, for example, from a fuel injector (not shown). Fuel, air, and other fluids provided by the fuel injector may pass through a swirler 92 which may extend through the opening 88 of the heat shield panel 74. FIG. 4B illustrates an opening center axis 94 indicating a centerline axis of the opening 88.

The heat shield panel 74 may include a wall 96 extending from the second surface 78 of the heat shield panel 74 toward the bulkhead 60. The wall 96 may extend around all or a portion of a periphery of the heat shield panel 74 (e.g., the outer circumferential side 80, the inner circumferential side 82, the first radially extending side 84, and the second radially extending side 86). All or a portion of the wall 96 may contact the first side 62 of the bulkhead 60 and may form a seal between the bulkhead 60 and the heat shield panel 74. The heat shield panel 74 may include one or both of an outer circumferential wall portion 128, including the portion of the wall 96 extending along the outer circumferential side 80 of the heat shield panel 74, and an inner circumferential wall portion 130, including the portion of the wall 96 extending along the inner circumferential side 82 of the heat shield panel 74. The first side 62 of the bulkhead 60 and the second surface 78 of the heat shield panel 74 may defined a cooling chamber 98 therebetween. To cool the heat shield panel 74, relatively cool air from outside the combustor 50 may be directed to the second surface 78 of the heat shield panel 74. For example, cooling air may be directed from the hood chamber 70 and through a plurality of impingement holes 100 extending through the bulkhead 60 such that the cooling air enters the cooling chamber 98 and impinges upon the second surface 78 of the heat shield panel 74, thereby cooling the heat shield panel 74. The heat shield panel 74 may further include one or more studs 102 projecting from the second surface 78 of the heat shield panel 74 for mounting the heat shield panel 74 to the bulkhead 60.

The heat shield panel 74 may further include a wall 104 extending from the second surface 78 of the heat shield panel 74 toward the bulkhead 60 around all or a portion of a periphery of the opening 88. All or a portion of the wall 104 may contact the first side 62 of the bulkhead 60 and may form a seal between the bulkhead 60 and the heat shield panel 74 further defining the cooling chamber 98. In various embodiments, the heat shield panel 74 may include one or more rails 106 extending from the second surface 78 of the heat shield panel 74 toward the bulkhead 60. The one or more rails 106 may contact the first side 62 of the bulkhead 60 and may form a seal between the bulkhead 60 and the heat shield panel 74. Accordingly, the one or more rails 106 may subdivide the cooling chamber 98 into a plurality of cooling chambers (e.g., an outer radial cooling chamber 98A and an inner radial cooling chamber 98B as shown in FIG. 3).

The combustor 50 may include one or more liner panels 108 mounted to and spaced away from one or both of the outer shell 52 and the inner shell 54. The liner panel 108 may include a first surface 110 facing the combustion chamber 56 and a second surface 112 opposite the first surface 110. The second surface 112 of the liner panel 108 have be spaced from the respective shell 52, 54 so as to define a liner cooling chamber 114 therebetween. The liner panel 108 may further include a first end 116, which is a proximate end of the liner panel 108 with respect to the heat shield panel 74, and a second end 118 opposite the first end 116. Similar to the heat shield panel 74, the liner panel 108 may include a liner wall 120 extending from the second surface 112 of the liner panel 108 toward the respective shell 52, 54. The liner wall 120 may extend around all or a portion of a periphery of the liner panel 108. The liner wall 120 may include a first end portion 122 including the portion of the liner wall 120 extending along or proximate the first end 116 of the liner panel 108. The first end portion 122 of the liner panel 108 may include a lip 90 which extends past the liner wall 120 (see, e.g., FIGS. 2 and 4A). Alternatively, the first end portion 122 of the liner panel 108 may be configured without the lip 90 such that the liner wall 120 extends directly along the first end 116 of the liner panel 108 (see, e.g., FIGS. 4B-D).

One or both of the outer shell 52 and the inner shell 54 may include a plurality of impingement holes 124 extending through the respective shell 52, 54 between an exterior of the combustor 50 and the liner cooling chamber 114 of the one or more liner panels 108. The plurality of impingement holes 124 may be configured to direct cooling air into the liner cooling chamber 114 so as to impinge upon the second surface 112 of the liner panel 108, thereby cooling the liner panel 108. The liner panel 108 may further include a plurality of effusion holes 126 extending through the liner panel 108 between the liner cooling chamber 114 and the combustion chamber 56. Accordingly, cooling air directed into the liner cooling chamber 114 by the plurality of impingement holes 124 may then flow through the plurality of effusion holes 126 and may then flow along the first surface 110 of the liner panel 108 to create a film cooling layer along the first surface 110.

The combustor 50 may include one or both of an outer cavity 132 and an inner cavity 134. The outer cavity 132 may be defined, at least in part, by one or more of the outer circumferential wall portion 128 of the heat shield panel 74, the outer shell 52, the bulkhead 60, and the first end portion 122 of the liner panel 108. The inner cavity 134 may be defined, at least in part, by one or more of the inner circumferential wall portion 130 of the heat shield panel 74, the inner shell 54, the bulkhead 60, and the first end portion 122 of the liner panel 108.

The outer circumferential wall portion 128 may include at least one cooling air passage 136 extending between the cooling chamber 98 and the outer cavity 132. The at least one cooling air passage 136 may be configured to purge the outer cavity 132 by directing a cooling air stream 138 from the cooling chamber 98 into the outer cavity 132. Similarly, the inner circumferential wall portion 130 may include at least one cooling air passage 140 extending between the cooling chamber 98 and the inner cavity 134. The at least one cooling air passage 140 may be configured to purge the inner cavity 134 by directing a cooling air stream 142 from the cooling chamber 98 into the inner cavity 134. For example, purging one or both of the outer cavity 132 and the inner cavity 134 may include removing at least a portion of the combustor gases from the cavities 132, 134 which are relatively hotter, on average, than the temperatures of the cooling air streams 138, 140. The at least one cooling air passage 138, 140 may include, for example, holes (see, e.g., FIGS. 3 and 5A), slots (see, e.g., FIG. 5B), a partial-height wall, for example, a wall extending a portion of a distance between the heat shield panel 74 and the bulkhead 60 (see, e.g., FIG. 5C), or any combination thereof. It should be understood that the at least one cooling air passages 136, 140 may be of any suitable number, shape, or size, as appropriate. The at least one cooling air passages 138, 140 may extend substantially perpendicularly through the respective circumferential wall portion 128, 130 (e.g., with respect to the direction of the wall 96 between the heat shield panel 74 and the bulkhead 60). Accordingly, the term "substantially", used with respect to the orientation of the at least one cooling air passages 136, 140, may refer to the at least one cooling air passages 136, 140 having an angle of 90 degrees+/−15 degrees with respect to the direction of the wall 96 between the heat shield panel 74 and the bulkhead 60.

The at least one cooling air passages 136, 140 may direct the respective cooling air streams 138, 142 through the respective cavities 132, 134, for example, along exemplary cavity purge flowpaths 144, as illustrated in FIG. 4B. The cooling air streams 138, 142 may flow into and then out of the respective cavities 132, 134 and subsequently form a cooling film along the first surface 76 of the heat shield panel 74. The cooling air streams 138, 142 may flow along the first surface 76 of the heat shield panel 74 in a general direction from the respective circumferential side 80, 82 of the heat shield panel 74 and toward the opening 88 of the heat shield panel 74. Accordingly, the cooling air streams 138, 142 may provide additional cooling to the heat shield panel 74, particularly in portions of the heat shield panel 74 subjected to higher temperatures such as the portions of the heat shield panel 74 that are radially disposed between the circumferential sides 80, 82 and the opening 88.

In various embodiments, one or more of the plurality of effusion holes 126 of the liner panel 108 may be directed toward the heat shield panel 74. For example, the one or more of the plurality of effusion holes 126 directed at the heat shield panel 74 may be configured to direct a cooling air stream 146, 148 toward the first surface 76 of the heat shield panel 74. One or more of the plurality of effusion holes 126 may be configured to direct the cooling air stream 146, 148 toward a radial end portion 150 of the first surface 76 of the heat shield panel 74. In various embodiments, the radial end portion 150 may have a width W1 extending between radially extending sides 84, 86 of the heat shield panel 74 and a length L1 from the respective circumferential side 80, 82 that is less than or equal to 10% of a length L2 of the heat shield panel 74 between the circumferential sides 80, 82. In various embodiments, the length L1 from the respective circumferential side 80, 82 may be less than or equal to 20% of a length L2 of the heat shield panel 74 between the circumferential sides 80, 82. The cooling air stream 146, 148 may further direct the respective cooling air streams 138, 142 along the cavity purge flowpaths 144 so as to form the cooling film along the first surface 76 of the heat shield panel 74. The cooling air streams 146, 148 may combine with the respective cooling air streams 138, 142 to form the cooling film along the first surface 76 of the heat shield panel 74.

In various embodiments, the one or more of the plurality of effusion holes 126 directed toward the heat shield panel 74 may extend through the liner panel 108 between the first surface 110 and the second surface 112 (see, e.g., FIGS. 4A and 4B), through the first end portion 122 of the liner wall 120 between the liner cooling chamber 114 and the combustion chamber 56 (see, e.g., FIG. 4C), or a combination thereof. In various embodiments, the one or more of the plurality of effusion holes 126 directed toward the heat shield panel 74 may alternatively or additionally extend through the shells 52, 54 (see, e.g., FIG. 4D) which may provide a higher velocity cooling air stream 146, 148 compared to the effusion holes 126 shown in FIGS. 4A-C. In various embodiments, the one or more of the plurality of effusion holes 126 directed toward the heat shield panel 74 may be disposed at an angle A2 relative to the first surface 110 of the liner panel 108, for example, between 40 and 100 degrees or between 50 and 80 degrees.

In various embodiments, the heat shield panel 74 may include a plurality of cooling holes 152 disposed about the opening 88 and extending through the heat shield panel 74 between the first surface 76 and the second surface 78 of the heat shield panel 74. The plurality of cooling holes 152 may be disposed in rows that surround and are generally concentric to the opening 88, such as one, two, three, or more rows of the plurality of cooling holes 152 around the opening 88. The plurality of cooling holes 152 may be configured to direct a cooling air stream 154. The plurality of cooling holes 152 may have an orientation that is skewed in a circumferential direction such that the plurality of cooling holes 152 provide a swirl effect about the opening center axis 94. As shown in FIG. 4B, each cooling hole of the plurality of cooling holes 152 may have an orientation such that the plurality of cooling holes 152 are configured to direct the cooling air stream 154, at least in part, in a generally radially inward direction with respect to the opening center axis 94. In various embodiments, each of the plurality of cooling holes 152 may be proximate the opening 88, for example, within 1.5 inches of the opening 88 or within 2.0 inches of the opening 88. In various embodiments, the plurality of cooling holes 152 may be disposed at an angle A1 relative to the first surface 76 of the heat shield panel 74, for example, between 20 and 40 degrees or between 25 and 35 degrees.

An exemplary swirler recirculation flowpath 156 illustrated in FIG. 4B. The cooling air streams 138, 142, 146, 148, and 154 may all be generally directed in a same direction as swirler recirculation gases traveling along the swirler recirculation flowpath 156, thereby strengthening flow rate of the gases traveling along the swirler recirculation flowpath 156. The heat shield panel 74 may be free of penetrations (e.g., effusion holes) between the plurality of cooling holes 152 and the circumferential sides 80, 82 and radially extending sides 84, 86 of the heat shield panel 74 in order to prevent interference with the gases of the swirler recirculation flowpath 156 and cooling air traveling along the cavity purge flowpaths 144 and to improve flame anchoring within the combustor 50.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A combustor for a gas turbine engine, the combustor comprising:
   an annular shell;
   an annular bulkhead connected to the shell;
   a heat shield panel having a first surface facing a combustion chamber and a second surface opposite the first surface, the heat shield panel mounted to the bulkhead and defining a cooling chamber between the bulkhead and the heat shield panel, the heat shield panel having a wall extending from the heat shield panel toward the bulkhead around at least a portion of a periphery of the heat shield panel, the wall including a circumferential wall portion including at least one cooling air passage extending between the cooling chamber and a cavity defined between the circumferential wall portion and the shell; and
   a liner panel mounted to the shell, the liner panel having a first end portion at a first end of the liner panel, the first end portion further defining the cavity, the liner panel including a first surface facing away from the shell and a second surface opposite the first surface, the liner panel further including a liner wall extending from the second surface of the liner panel at the first end of the liner panel and contacting the shell;
   wherein the at least one cooling air passage is configured to purge the cavity by directing a first cooling air stream from the cooling chamber into the cavity; and
   wherein the first end portion of the liner panel is configured to direct the first cooling air stream from the cavity to the first surface of the heat shield panel.

2. The combustor of claim 1, wherein the liner panel includes at least one effusion hole directed toward the heat shield panel.

3. The combustor of claim 2, wherein the at least one effusion hole is directed toward a radial end portion of the heat shield panel.

4. The combustor of claim 2, wherein the at least one effusion hole is disposed at an angle between 50 and 80 degrees relative to the first surface of the liner panel.

5. The combustor of claim 1, wherein the heat shield panel includes an opening having an opening center axis, the opening extending through the heat shield panel between the first surface and the second surface of the heat shield panel.

6. The combustor of claim 5, wherein the heat shield panel includes a plurality of cooling holes disposed about the opening and extending through the heat shield panel between the first surface and the second surface of the heat shield panel.

7. The combustor of claim 6, wherein each cooling hole of the plurality of cooling holes is directed, at least in part, radially inward with respect to the opening central axis.

8. The combustor of claim 7, wherein the heat shield panel is free of penetrations between the plurality of cooling holes and the at least one cooling air passage.

9. The combustor of claim 7, wherein each cooling hole of the plurality of cooling holes is disposed at an angle between 20 and 40 degrees relative to the first surface of the heat shield panel.

10. The combustor of claim 9, wherein each cooling hole of the plurality of cooling holes is disposed at an angle between 25 and 35 degrees relative to the first surface of the heat shield panel.

11. The combustor of claim 1, wherein the at least one cooling air passage is a plurality of cooling air holes.

12. The combustor of claim 11, wherein the plurality of cooling holes extend substantially perpendicularly through the circumferential wall portion.

13. The combustor of claim 1, wherein the circumferential wall portion extends from the second surface of the heat shield panel a portion of a distance between the heat shield panel and the bulkhead.

14. The combustor of claim 1, wherein the first cooling air stream is unobstructed between the circumferential wall portion and the shell.

15. A combustor for a gas turbine engine, the combustor comprising:
   an annular outer shell and an annular inner shell radially spaced from the outer shell;
   a bulkhead connecting the outer shell to the inner shell;

a heat shield panel having a first surface facing a combustion chamber and a second surface opposite the first surface, the heat shield panel mounted to the bulkhead and defining a cooling chamber between the bulkhead and the heat shield panel, the heat shield panel having a wall extending from the heat shield panel toward the bulkhead around at least a portion of a periphery of the heat shield panel, the wall including an outer circumferential wall portion and an inner circumferential wall portion, the outer circumferential wall portion including a first at least one cooling air passage extending between the cooling chamber and an outer cavity defined between the outer circumferential wall portion and the outer shell and the inner circumferential wall portion including a second at least one cooling air passage extending between the cooling chamber and an inner cavity defined between the inner circumferential wall portion and the inner shell; and a plurality of liner panels, a first liner panel of the plurality of liner panels mounted to the outer shell and a second liner panel of the plurality of liner panels mounted to the inner shell, the first liner panel having a first forward end portion at a first forward end of the first liner panel, the first forward end portion further defining the outer cavity, the second liner panel having a second forward end portion at a second forward end of the second liner panel, the second forward end portion further defining the inner cavity, wherein each of the first liner panel and the second liner panel include at least one effusion hole directed toward the heat shield panel;

wherein the first at least one cooling air passage is configured to purge the outer cavity by directing a first cooling air stream from the cooling chamber into the outer cavity and the second at least one cooling air passage is configured to purge the inner cavity by directing a second cooling air stream from the cooling chamber into the inner cavity; and wherein the first end portion of the liner panel is configured to direct the first cooling air stream from the cavity to the first surface of the heat shield panel.

16. The combustor of claim 15, wherein the heat shield panel includes:

an opening having an opening center axis, the opening extending through the heat shield panel between the first surface and the second surface of the heat shield panel; and a plurality of cooling holes disposed about the opening and extending through the heat shield panel between the first surface and the second surface of the heat shield panel, each cooling hole of the plurality of cooling holes directed, at least in part, radially inward with respect to the opening central axis;

wherein the heat shield panel is free of penetrations between the plurality of cooling holes and the at least one cooling air passage.

17. A method for cooling a combustor for a gas turbine engine, the method comprising:

providing a heat shield panel mounted to a bulkhead and defining a cooling chamber between the bulkhead and the heat shield panel, the heat shield panel having a wall extending from the heat shield panel toward the bulkhead around at least a portion of a periphery of the heat shield panel, the wall including a circumferential wall portion including at least one cooling air passage extending between the cooling chamber and a cavity defined between the circumferential wall portion and a shell connected to the bulkhead;

purging the cavity by directing a first cooling air stream, with the at least one cooling air passage, from the cooling chamber into the cavity;

directing the first cooling air stream toward the first surface of the heat shield panel with a first end portion of a liner panel, the liner panel mounted to the shell; and directing a second cooling air stream toward the heat shield with at least one effusion hole extending through the liner panel.

18. The method of claim 17, wherein the heat shield panel includes an opening having an opening center axis, the method further comprising directing a third cooling air stream radially inward with respect to the opening center axis with a plurality of cooling holes extending through the heat shield.

* * * * *